(12) United States Patent
Mostafa et al.

(10) Patent No.: US 7,272,417 B2
(45) Date of Patent: Sep. 18, 2007

(54) SYSTEMS AND METHODS FOR IMPLEMENTING FULLY REDUNDANT ANTENNA HOPPING WITH MULTI-CARRIER POWER AMPLIFIERS AND COMBINING SCHEMES WITHIN A BASE STATION

(75) Inventors: Ayman Mostafa, Alpharetta, GA (US); Mark Austin, Guaynabo, PR (US)

(73) Assignee: Cingular Wireless II, LLC, Atlanta, GA (US)

( * ) Notice: Subject to any disclaimer, the term of this patent is extended or adjusted under 35 U.S.C. 154(b) by 397 days.

(21) Appl. No.: 10/832,552

(22) Filed: Apr. 26, 2004

(65) Prior Publication Data

US 2004/0214608 A1    Oct. 28, 2004

Related U.S. Application Data

(60) Provisional application No. 60/465,997, filed on Apr. 25, 2003.

(51) Int. Cl.
*H04M 1/00*    (2006.01)
(52) U.S. Cl. ............................ 455/562.1; 455/552.1; 455/423; 455/277.1
(58) Field of Classification Search ............ 455/561, 455/562.1, 101, 67.11, 572, 552.1, 553.1, 455/276.1, 277.1, 277.2
See application file for complete search history.

(56) References Cited

U.S. PATENT DOCUMENTS

| 5,500,944 | A | * | 3/1996 | Yoshida | 455/561 |
| 5,654,901 | A | * | 8/1997 | Boman | 455/114.1 |
| 5,752,161 | A |   | 5/1998 | Katisko et al. |   |
| 5,930,248 | A | * | 7/1999 | Langlet et al. | 455/67.16 |
| 6,047,199 | A |   | 4/2000 | DeMarco |   |
| 6,122,505 | A | * | 9/2000 | Genell et al. | 455/423 |
| 6,215,997 | B1 | * | 4/2001 | Han | 455/423 |

(Continued)

FOREIGN PATENT DOCUMENTS

EP    0639035 A1    2/1995

(Continued)

OTHER PUBLICATIONS

AGILENT Technologies, "New Remote Radio Unit for 3G UMTS Wireless Networks," Powerwave Technologies Press Release, retrieved from URL http://www.3G.co.uk, Mar. 27, 2003, 1 page.

(Continued)

*Primary Examiner*—Lana Le
(74) *Attorney, Agent, or Firm*—Zagorin O'Brien Graham LLP

(57) ABSTRACT

A Transmit Diversity Redundancy controller dynamically mediates implementation of diversity and antenna hopping by detecting and remediating faults on antenna branches while minimizing the capital investment required. The controller monitors the equipment along the antenna branches. If a fault occurs, the controller determines the appropriate fault remediation measures to implement based on default settings, or relays an indicator to an external processor (e.g., a BTS or BSC CPU) and awaits instructions. If traffic on the BTS is high, the external processor instructs the TDR controller to combine the signals carried by the downed branch with the signals carried by the active branches, and the combined carrier signals are transmitted over the active branches. Otherwise, the external processor instructs the controller to allow signals carried by the downed antenna branch to be dropped, and notifies the BSC to suspend assignment of calls to the dropped carriers until the branch is restored.

15 Claims, 11 Drawing Sheets

U.S. PATENT DOCUMENTS

| | | | |
|---|---|---|---|
| 6,389,281 B1 * | 5/2002 | Lee | 455/67.14 |
| 6,510,146 B1 | 1/2003 | Korpela et al. | |
| 6,522,642 B1 | 2/2003 | Scott | |
| 6,522,896 B2 | 2/2003 | Chuberre et al. | |
| 7,065,352 B2 * | 6/2006 | Bogart et al. | 455/562.1 |

FOREIGN PATENT DOCUMENTS

| | | | |
|---|---|---|---|
| EP | 0888026 A2 | 12/1998 | |
| EP | 1217779 A1 | 6/2002 | |
| WO | WO 02/11315 A2 | 2/2002 | |
| WO | WO 02/11315 A3 | 2/2002 | |

OTHER PUBLICATIONS

Ericsson, Multi Carrier Power Amplifiers (MCPA), white paper, retrieved from URL http://www.ericsson.com, Apr. 11, 2003, 1 page.

Heath, Jr., Robert W. and Paulraj, Arogyaswami, "Transmit Diversity Using Decision-Directed Antenna Hopping," in *Proceedings of IEEE Communication Theory Mini-Conference*, Vancouver, BC, Canada, Jun. 6-10, 1999, pp. 141-145.

Jeong, Yeon Hyoon et al., "Differentially Coherent Combining for Code Acquisition in Inter-Cell Asynchronous DS/CDMA Systems," in *Proceedings of the Joint Conference on Communications & Information (JCCI)*, 2000, pp. 502-508.

POWERWAVE Technologies, Inc., "Multi-Carrier Power Amplifiers for W-CDMA Wireless Systems," datasheet, Jun. 1998, 6 pages.

Telecommunications Development, Asia Pacific, "Multi-Carrier Power Amplifiers," 1997-2000, 2 pages.

Zekavat, Seyed Alireza et al., "Smart Antenna Spatial Sweeping for Combined Directionality and Transmit Diversity," in *Journal of Communications and Networks*, Dec. 2000, vol. 2, No. 4, 6 pages.

* cited by examiner

SYSTEMS AND METHODS FOR IMPLEMENTING FULLY REDUNDANT ANTENNA HOPPING WITH MULTI-CARRIER POWER AMPLIFIERS AND COMBINING SCHEMES WITHIN A BASE STATION

RELATED APPLICATION

The present application claims priority to U.S. Provisional Application Ser. No. 60/465,997 entitled "Systems and Methods for Implementing Fully Redundant Antenna Hopping with Multi-Carrier Power Amplifiers and Combining Schemes within a Base Station," filed on Apr. 25, 2003, the entirety of which is incorporated herein.

BACKGROUND OF THE INVENTION

1. Field of the Invention

The present invention relates in general to wireless communications infrastructures, and in particular, to systems and methods for implementing antenna hopping and redundancy with multi-carrier power amplifiers and combining schemes within a base station.

2. Description of the Related Art

In wireless communication systems, two approaches have evolved to combat small scale fading of the mobile radio channel caused by multipath propagation. To increase receiver performance, either adaptive antennas or diversity schemes can be employed. One such diversity scheme is called "antenna hopping". Antenna hopping has proven to be particularly useful and effective for small spectrum applications, typically providing potential gains of up to 10-30% in network capacity.

In antenna hopping, consecutive bursts of information are transmitted on different antennas in an antenna array located in a single Base Transceiver Subsystem (BTS). A diversity gain is achieved because multi-path transmission significantly reduces the probability that the signal components will fade simultaneously. The diversity gain is most pronounced in low mobility conditions, i.e., when mobile stations are moving slowly. FIG. 1 is a functional block diagram illustrating the elements of a BTS configured to implement an antenna hopping scheme. To achieve additional performance improvements, an antenna hopping scheme is often combined with a frequency hopping scheme, which involves applying different frequency bands (shown as f1 through f6) to different antennas in an alternating sequence.

Increasing capacity demand with respect to a particular cell often dictates the need for the deployment of more signal carrying transceivers (TRXs) at the corresponding BTS. To maintain full coverage for the area served by the cell, the output signals from the TRXs are preferably combined and then amplified and otherwise optimized. If the TRX output signals are not combined, an excessive number of feeders connecting each TRX to the antenna are required, possibly exceeding the structural capabilities of the cell tower.

Commonly, the TRX output signals are combined using low power combiners. Then, a device such as a high power ultra linear wideband Multi-Carrier Power Amplifier (MCPA) amplifies each of the transmitted signals so that the signals can be received over a desired area.

Antenna hopping inherently requires parallel sets of antennas, as well as other equipment such as amplifiers, combiners, and duplexers (DPXs). For a small number of radios, this capital equipment can become prohibitively expensive, particularly because a single MCPA may cost several thousand dollars.

Furthermore, an additional level of redundancy of BTS hardware is desirable to maximize system reliability. For instance, a dedicated backup MCPA known as a "hot standby" is often deployed as a backup—taking over in the event of failure of the active MCPA for a particular antenna. Maintaining a hot standby MCPA and associated hardware for each antenna or set of antennas is an expensive solution. One alternative for maintaining system reliability is to provide full redundancy without antenna hopping or transmit diversity. Obviously, however, redundancy without diversity does not address the problem of signal fading. There is a need, therefore, to create a system and methodology that provides for both diversity and redundancy without incurring the prohibitive cost associated with previous systems for providing such redundancy.

SUMMARY OF THE INVENTION

The present invention addresses the shortcomings identified above by providing systems and methods for implementing fully redundant antenna hopping with fault detection within a Base Transceiver Subsystem (BTS) that utilizes frequency combining schemes.

Advantageously, the systems and methods of the present invention enable the coexistence of diversity schemes such as antenna hopping and fault detection with full redundancy while minimizing the capital investment in BTS equipment. Briefly, certain aspects of the invention are summarized with respect to the various embodiments described in more detail herein.

One aspect of the invention is selective implementation of either a diversity or remediation scheme, based upon the existence of a fault. More specifically, various embodiments of the present invention include a transmit Diversity Redundancy (TDR) controller. The TDR controller maintains the BTS in either diversity mode or remediation mode based upon the existence of a fault on an antenna branch associated with the base station transceiver, and upon the traffic demand on the BTS at the time of the fault.

The BTS preferably includes one diversity mode combiner for each antenna, as well as an additional remediation mode combiner (hereinafter referred to as a "recombiner") that is used in the event of a fault. Each diversity mode combiner is connected directly to a feeder and combines one group of carrier signals into a combined signal for transmission along that feeder. The remediation mode recombiner is utilized when a fault is detected on an essential device along any of the feeders. The purpose of the remediation mode recombiner is to combine the previously combined signals into a recombined signal, and to transmit the recombined signal along the feeders that did not experience the fault.

The TDR controller can also include a fault detector. The fault detector interfaces with the essential devices on each feeder path to detect a fault along either the first feeder path or the second feeder path. Upon detecting the fault, the fault detector generates a fault indicator. The fault indicator includes information that indicates whether the fault occurred along the first feeder or along the second feeder (assuming a two feeder environment).

The TDR controller also includes a processor. The processor receives the fault indicator from the fault detector, determines or receives instructions as to the appropriate fault remediation measures to implement, and implements the fault remediation measures.

According to another aspect of the invention, active and passive fault remediation measures are also implemented selectively and dynamically via decision-making logic that minimizes the impact of faults. In associated embodiments, the TDR controller is instructed to reduce coverage (by implementing active remediation) or reduce capacity (by implementing passive remediation), based upon current traffic data for the cell site. In certain embodiments, the TDR controller or the Central Processing Unit of the BTS indirectly monitors the traffic carried by the BTS and makes the determination whether to implement active or passive remediation. In other embodiments, the determination whether to implement active or passive remediation is made by a Base Station Controller (BSC).

Certain circumstances invoke active fault remediation. In periods of low demand, exemplary methods of the invention determine that wireless traffic can be supported by the active antenna branch with half of the capacity, while the other antenna branch is being repaired. The TDR controller does not switch the BTS to remediation mode. To implement active fault remediation, if the fault occurs along one feeder (the downed branch), the processor invokes a switching procedure that disconnects the other feeders from the respective diversity mode combiners and connects the other feeders (the active branches) to the remediation mode combiner. The third combiner receives the output of the first combiner and the second combiner, and combines these outputs to create a third combined signal. The third combined signal is then transmitted along the active feeder. Thus, all of the frequency carriers represented by the first and second groups of carrier signals are transmitted via the active branch—sacrificing coverage in order to maintain the frequency-carrying capacity of the BTS. The BTS then notifies the BSC that antenna hopping and/or transmit diversity have been disabled.

Certain other circumstances invoke passive remediation. If a fault occurs during a peak traffic period, the TDR controller switches all signal carriers from the downed antenna branch to the active branch, thereby sacrificing coverage. To implement passive remediation, traffic and fault data are processed to determine that the frequencies associated with a fault should remain dropped for the duration of the fault, and the BSC executes a frequency re-packing process for all new calls. An example of passive remediation is non-frequency RF hopping arrangements.

Advantageously, the systems and methods of the invention are scalable to address BTSs having any number of antennas.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
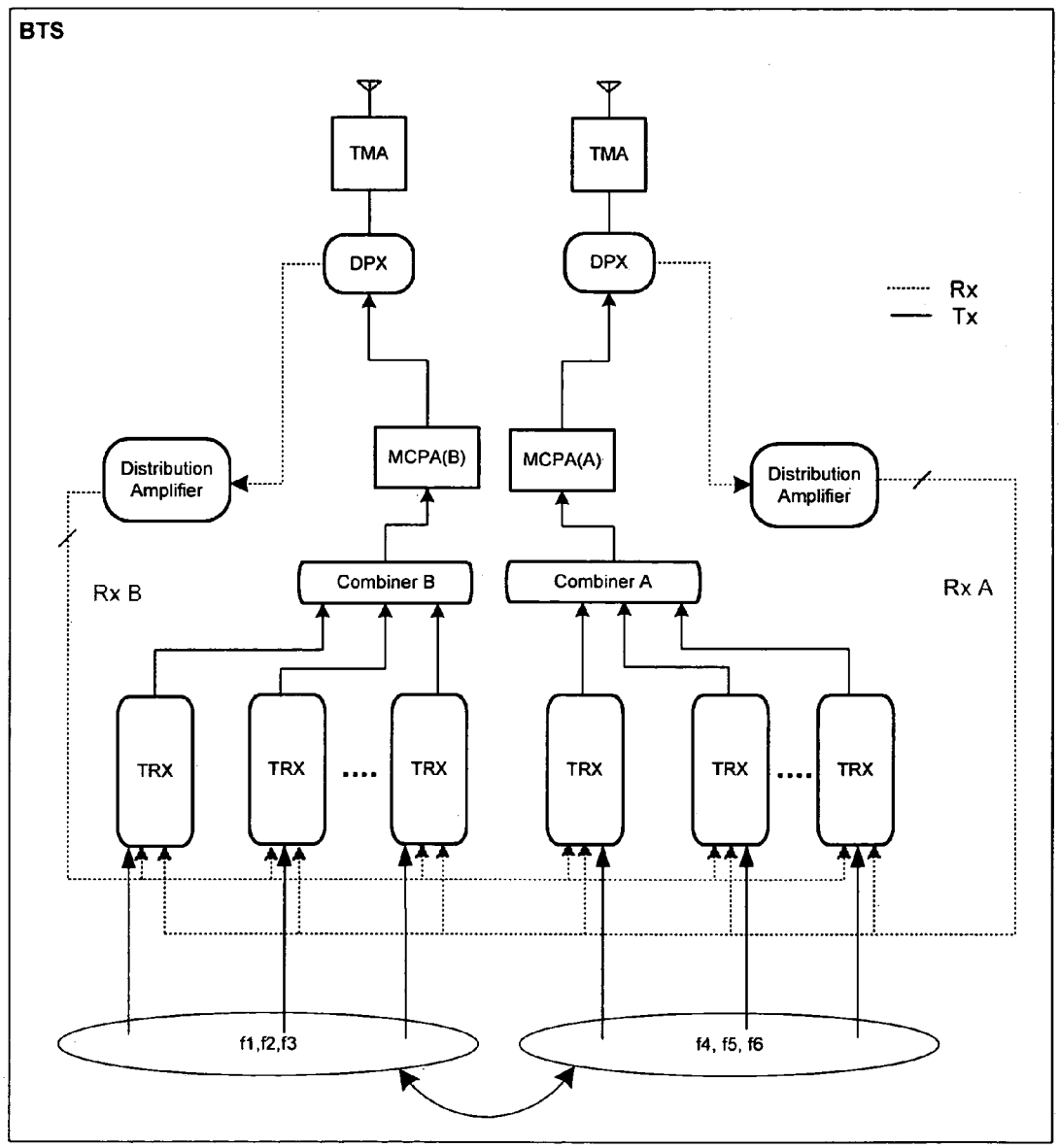
FIG. 1 is a functional block diagram illustrating certain elements of a BTS configured to implement an antenna hopping scheme (without redundancy)
Figure 2:
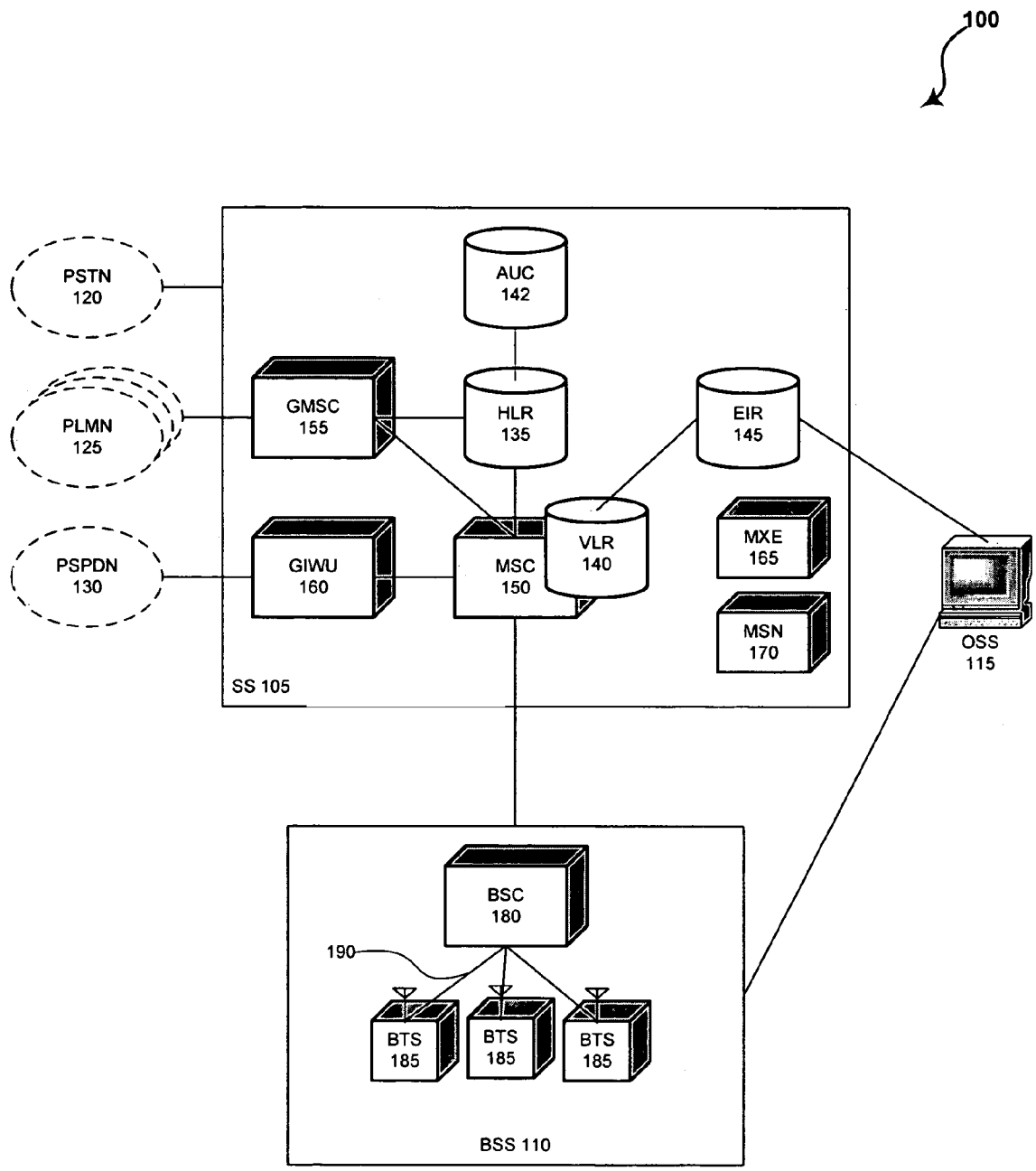
FIG. 2 is a block diagram illustrating an exemplary environment for the various embodiments of the invention.

Particular embodiments of the present invention will now be described in greater detail with reference to the figures. FIG. 2 is a block diagram illustrating an exemplary environment for the various embodiments of the invention. As shown in FIG. 2, the exemplary environment is a GSM (Global System For Mobile Communications) network 100, although those skilled in the art will appreciate that the present invention can be implemented in various other wireless and radio frequency data transmission systems, including networks utilizing EDGE, TDMA, FDMA, CDMA, WCDMA, OFDM, and similar communications protocols.

The GSM network 100 includes three major sub-systems—namely, a switching system (SS) 105, a Base Station System (BSS) 110, and an operation and support system (OSS) 115. The SS 105 performs subscriber-related functions, as well as call processing within the GSM network 100 and between the GSM network 100 and other voice/data systems, such as a public switched telephone network (PSTN) 120, other public land mobile networks (PLMNs) 125, and a packet-switched public data network (PSPDN) 130. The SS 105 includes the following functional units: a home location register (HLR) 135, a visitor location register (VLR) 140, an authentication center (AUC) 142, an equipment identity register (EIR) 145, and a mobile services switching center (MSC) 150. The SS 105 also includes a gateway mobile services switching center (GMSC) 155, a GSM interworking unit (GIWU) 160, a message center (MXE) 165, and a mobile service node (MSN) 170.

The MSC 150 interfaces directly with at least one BSS 110 which performs all radio-related functions for the GSM network 100. Although various configurations are possible, the BSS 110 shown as an example in FIG. 2 includes one base station controller (BSC) 180 and three Base Transceiver Subsystems (BTSs) 185. The BSC 180 is a functional entity that provides and controls the logical interconnection between the MSC 150 and the BTSs 185. The BSC 180 may be physically located with the BTS 185, or may communicate with the BTS 185 via an interface 190, such as an Abis interface. Monitoring and control functions for the GSM network 100 are performed by the operation and support system (OSS) 115. Each of the three BTSs 185 corresponds to a sector served by the BSS 110.

Figure 3:
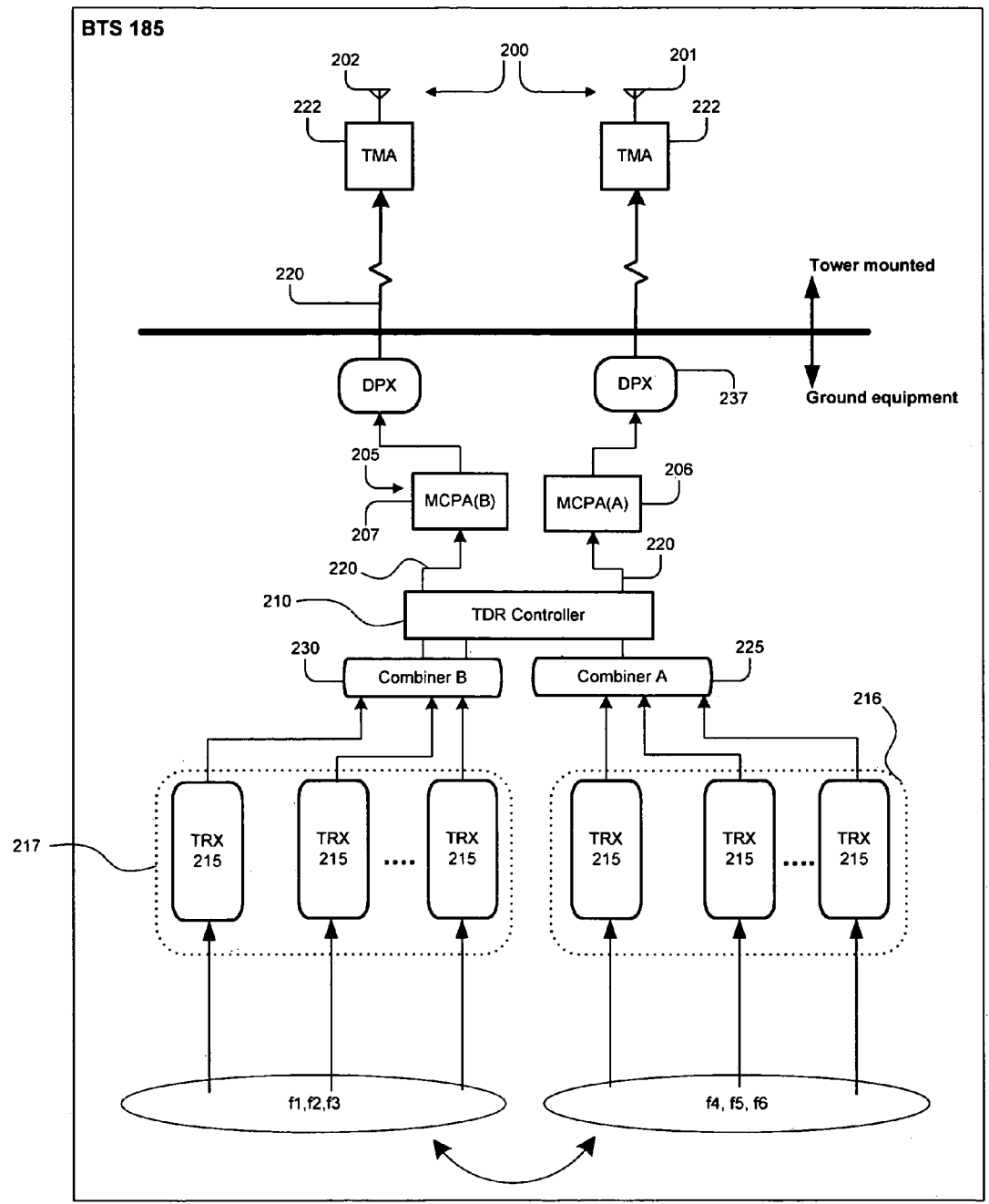
FIG. 3 is a block diagram illustrating the functional configuration of certain elements of a BTS implementing a fully redundant antenna hopping scheme with fault detection, using an exemplary TDR controller consistent with the various embodiments of the invention.

FIG. 3 is a block diagram illustrating the functional configuration of certain elements of a simplified exemplary BTS 185. For purposes of clarity, various elements of the transmission (Tx) pathways of the BTS 185 are shown, and various elements (distribution amplifiers, etc.) of the reception (Rx) pathways of the BTS 185 are not shown. The BTS 185 consists primarily of radio equipment, such as antennas and several radio transceivers (TRYs) (shown collectively as 215), needed to provide a radio interface to mobile stations operating in a single cell. At any point in time, one group of the TRXs (TRY group A 216 ) accesses a particular antenna.

Referring now to the exemplary embodiment shown, the BTS 185 implements an antenna hopping scheme with full redundancy triggered by detection of faults or equipment unavailability. The functional components include at least two antennas 200. In the exemplary embodiment, the pair of antennas 200—consisting of Antenna A 201 and Antenna B 202—transmits and receives signals for each sector served by the BTS 185. Each of the antennas 200 transmits signals that have been amplified by an MCPA 205. Although each MCPA 205 may be an identical device, for purposes of clarity, the MCPA 205 associated with Antenna A 201 will be referred to as MCPA(A) 206 and the MCPA 205 associated with Antenna B 202 will be referred to as MCPA(B) 207.

The MCPAs 205 amplify signals that have been combined and optimally routed by a TDR controller 210. The TDR controller 210 is a device or group of devices that preferably perform the following functions: fault detection, and fault remediation through recombination and rerouting of carrier signals.

Figure 4:
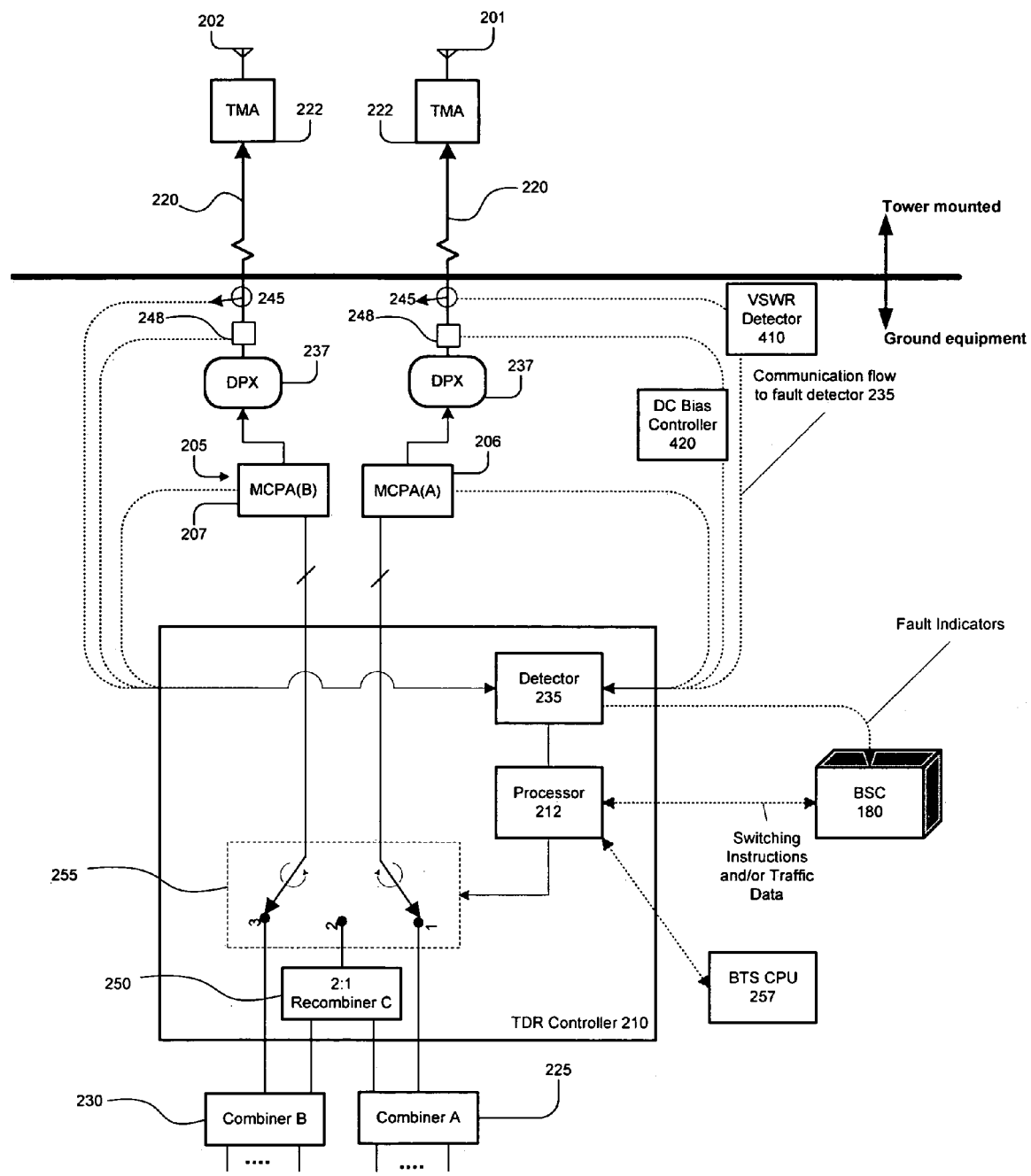
FIG. 4 is a block diagram illustrating the functional configuration of the exemplary TDR controller in diversity mode.

With reference to FIG. 4, the TDR controller 210 includes a processor 212, a fault detector 235, at least one recombiner 250, and a switching mechanism 255.

The processor 212 may be independent of or integral to the central processing unit (CPU) 257 of the BTS 185. A function of the processor 212 is to control the operation of the switching mechanism 255 in response to instructions to implement or terminate fault remediation. In addition, in certain embodiments, the processor 212 also functions to determine whether remediation is necessary. Alternatively, the determination whether remediation is necessary can be made at the BSC 180. Logical connections for the communication of switching instructions and/or traffic data between the processor 212, BSC 180, and BTS CPU 257 are shown in FIG. 4.

The processor 212 is preferably joined by a system bus to a memory (not shown). The memory may include high speed storage devices, such as read only memory (ROM) and random access memory (RAM). The ROM stores the basic input/output system (BIOS), which contains basic routines that aid in transferring information between elements within the processor 212 during start-up, and at other times. The RAM may store program modules and drivers. In particular, the RAM may include an operating system, one or more application programs, program data, and web browser programs. UNIX is but one example of a suitable operating system.

The processor 212 also may include a plurality of drives interconnected to other components of the processor 212 through the system bus (or otherwise). Exemplary drives include low speed storage devices, such as a hard disk drive, a magnetic disk drive, and an optical disk drive. Specifically, each disk drive may be connected to the system bus through an appropriate interface (respectively, a hard disk drive interface, a magnetic disk drive interface, and an optical drive interface). Further, the processor 212 may include non-volatile storage or memory through the drives and their associated computer-readable media. For example, the magnetic disk drive allows for the use of a magnetic disk, and the optical disk drive allows for the use of an optical disk. Other types of media that are readable by a computer, e.g., magnetic cassettes, digital video disks, flash memory cards, ZIP cartridges, JAZZ cartridges, among others, also may be used in the exemplary operating environment.

In addition, the processor 212 may include a serial port interface connected to the system bus. The serial port interface connects to input and output devices that allow commands and information to be passed to and from the processor 212. The input devices may include a keyboard, a mouse, and/or other input device. Pens, touch-operated devices, microphones, joysticks, game pads, satellite dishes, scanners, and other input devices also may be used to enter commands and/or information. The input devices also may be connected through other interfaces, such as an Ethernet port or a universal serial bus (USB). Further, the TDR controller 210 may include output devices, such as a monitor, printer, or other display device. The display device is connected through an interface such as a video adaptor (not illustrated) to the system bus. The TDR controller 210 may include other peripheral and/or input/output devices, such as speakers or printers (not illustrated).

Combination of Carrier Signals

In the absence of a fault, the TDR controller 210 operates in diversity mode—enabling the implementation of various diversity schemes, including antenna and frequency hopping. In diversity mode, the TDR controller 210 combines carrier signals from the two groups of TRXs 215 (shown in FIG. 3 as TRX Group A 216 and TRX Group B 217) into two combined signals, each combined signal being carried along an antenna branch to the respective antenna 200 on a single feeder 220. As used herein, the term "antenna branch" refers to the feeder 220 and all elements along the feeder 220, downstream from the TDR controller 210 and including the antenna 200. It should be noted that, as used herein, the term "mode" simply refers to a functional state of the BTS equipment, particularly with respect to the primary purpose for the redundant antenna branches and associated equipment.

Referring to FIG. 4, the TDR controller 210 includes Combiner A 225 for combining carrier signals from TRX Group A 216, and Combiner B 230 for combining carrier signals from TRX Group B 217. In diversity mode, the combined signals from Combiner A 225 are relayed to MCPA(A) 206, and the combined signals from Combiner B 230 are relayed to MCPA(B) 207.

In each of the embodiments, diversity is achieved primarily by means of simultaneous transmit antennas, antenna hopping, and/or frequency hopping. However, the systems and methods of the invention can be implemented using any known or later developed diversity and combining methods, including any method involving varying the transmission path and frequency bands of the combined signals transmitted via the antennas 200, as well as other space diversity, polarization diversity and radiation pattern diversity protocols.

Fault Detection

The TDR controller 210 includes a fault detector 235 for detecting a fault, an example of which is shown as element 236, associated with "essential equipment" required to transmit a signal along an antenna branch, including the MCPA 205, feeder 220, duplexer (DPX) 237, Tower Mounted/Masthead Amplifier (TMA) 222, and/or the corresponding antenna 200. The fault detector 235 may be integrated with the processor 212, or can be implemented as a discrete element of the TDR controller 210.

The fault detector 235 is preferably a functional component consisting of relay devices, such as sensors, directional couplers, and/or other interconnections, for relaying operational status information from the essential equipment associated with the antenna branch to the processor 212 and (directly or indirectly) to the BSC 180. It should be understood that the fault detector 235 can be implemented using any combination of appropriate hardware and/or software detection circuits.

The fault detector 235 can either directly or indirectly detect a fault in any of the essential equipment. For instance, to detect an antenna fault, the fault detector 235 preferably interfaces with a VSWR (Voltage Standing Wave Ratio) detector 410 via a directional coupler 245 on each feeder 220 segment adjacent to each antenna 200. If either antenna 200 fails, the detector 235 detects abnormally high reflected signals and indicates a fault. In response, the fault detector 235 passes a flag as a fault indicator to the processor 212.

The fault detector 235 preferably compares signals detected along the antenna path with signals emanating from the TRXs 215. This comparison prevents the fault detector 235 from indicating an antenna path fault when a detected signal drop is actually caused by failure of a TRX 215.

The TMA 222 is an electronic device that requires a power source such as a BIAS-T 248 to operate. The BIAS-T 248 injects a blend of the signals with DC current from a DC bias controller (not shown) of the BSS 110 onto the feeder 220. TMAs 222 are commonly fitted with a bypass relay that will bypass the amplifier component of the TMA 222 if a power failure occurs. If, however, a catastrophic fault disables the TMA 222 and the bypass relay, the fault detector 235 detects the fault by interfacing with the DC-bias controller 410 and/or other alarm elements that are typically provided at the BSS 110 level. The fault detector 235 relays this fault indication to the processor 212.

In the event of failure of either MCPA 205, the affected MCPA 205 indicates a fault via a data output from its internal central processing unit (CPU). The fault detector 235 relays this fault indication to the processor 212. Thus, it should be noted that, in addition to or in lieu of self-detecting, the fault detector 235 can indirectly detect faults by receiving fault indicators from other fault sensing equipment and then by communicating the fault indicators to the processor 212 or to the BSC 180.

Any fault occurring between an MCPA 205 and the TDR controller 210 results in loss of the signal to the MCPA 205. In response, the CPU within the MCPA 205 indicates a "no signal" status. The fault detector 235 detects the "no signal" status of the MCPA 205, generates a fault signal, and relays the fault signal to the processor 212.

Fault Remediation

Fault remediation measures include either 1) switching from diversity mode to remediation mode (active remediation); or 2) allowing the carriers associated with the faulty antenna branch to be dropped (passive remediation). Preferably, the determination of which fault remediation measure to implement is made either by the BTS CPU 257 or the BSC 180. The TDR controller 210 processes the fault indicator locally, relays the indicator to the BSC 180, receives commands from the BSC 180 based on traffic data or other parameters, and implement the appropriate fault remediation measures according to the received commands. After implementing fault remediation measures, the TDR controller 210 notifies the BSC 180 of the remediation measures taken. In certain other embodiments, the processor 212 relays the fault indicator and any associated data to another external processor (which may receive traffic or other relevant data from the BSC 180 or other data source), and receives fault remediation instructions from that external processor (e.g., the CPU of the BTS). The logic involved in making this determination is described in more detail below.

Active Remediation

To actively remediate a fault 236, upon receiving a fault indicator from the fault detector 235 indicating a fault 236 on an antenna branch, the TDR controller 210 switches the BTS 185 from diversity mode to remediation mode.

Referring again to FIG. 4, diversity mode is indicated when the antenna branch that feeds Antenna A 201 is switched to Position 1, and the antenna branch that feeds Antenna B 202 is switched to Position 3. Thus, in diversity mode, Combiner A 225 and Combiner B 230 are active, and Recombiner C 250 is not connected to either antenna branch.

Figure 5:
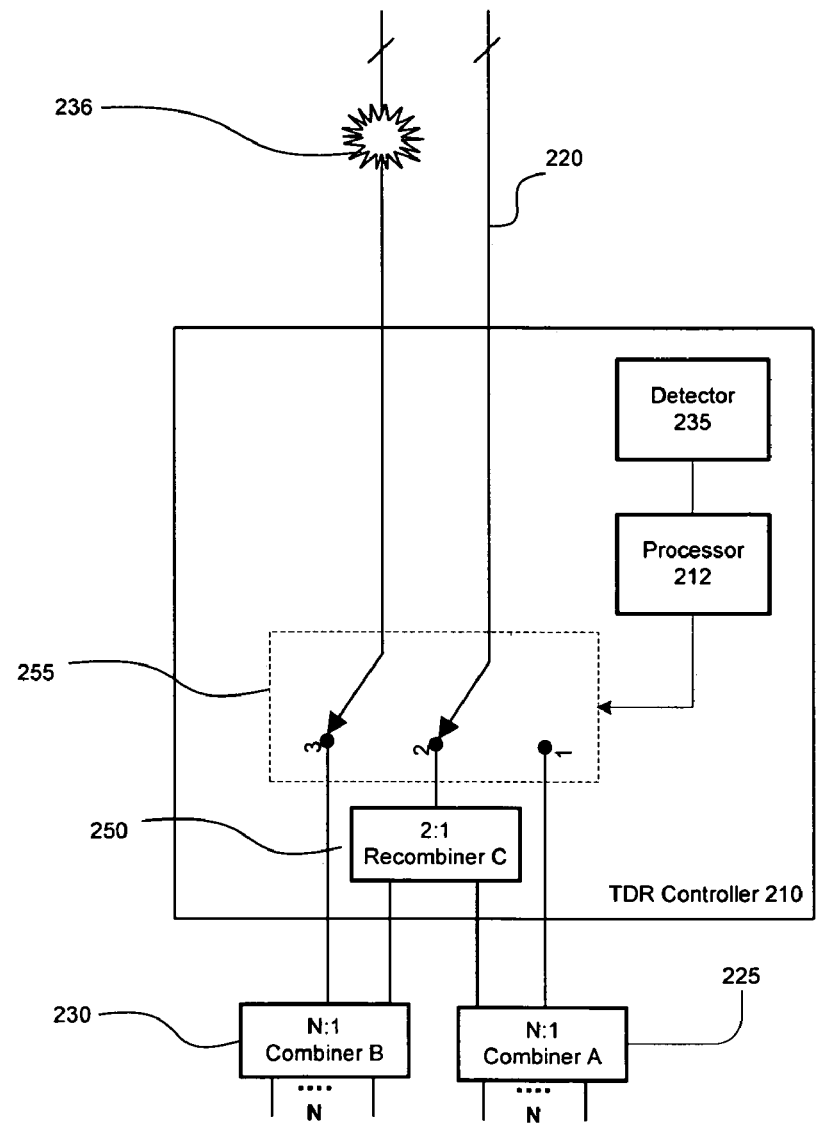
FIG. 5 is a block diagram illustrating the functional configuration of the exemplary TDR controller in remediation mode.

In comparison, FIG. 5 is a block diagram illustrating the functional configuration of the exemplary TDR controller 210 in remediation mode. To switch from diversity mode to remediation mode, the TDR controller 210 routes the outputs of Combiner A 225 and Combiner B 230 through Recombiner C 250. The TDR controller 210 preferably concurrently switches the output of Recombiner C 250 to feed the recombined signal along the antenna branch that has not experienced a fault 236 (the "active" antenna branch).

More specifically, according to the embodiment shown, active remediation occurs when, in response to detecting a fault 236, the TDR controller 210, through its processor 212, operates the switching mechanism 255 to switch the active antenna branch to Position 2. In FIG. 5, the fault 236 has been detected by the fault detector 235 in an essential element of the antenna branch. The antenna branch associated with Antenna B is therefore the "downed branch." The antenna branch associated with Antenna A is the "active branch." Switching the active branch from Position 1 to Position 2 breaks the circuit with the combiner associated with the active antenna branch and closes a circuit between the active antenna branch and Recombiner C 250.

In FIG. 5, the antenna branch associated with Antenna B 202 has experienced a fault 236 and is therefore the downed branch. When the fault detector 235 detects the fault 236 in the downed branch, the fault detector 235 relays a fault indication to the processor 212. The fault indication identifies the downed branch and the active branch. In response, the processor 212 operates the switching mechanism 255 to switch the active antenna branch from Position 1 to Position 2. Whereas in diversity mode, the active antenna branch only received a portion of the traffic handled by the BTS 185, in remediation mode, Antenna A 201 receives the output of Recombiner C 250, which consists of the recombination of all of the user data then carried on carriers f1 through f6, which represents all traffic carried by the sector served by the BTS 180. The downed branch remains switched to Position 3.

Figure 6:
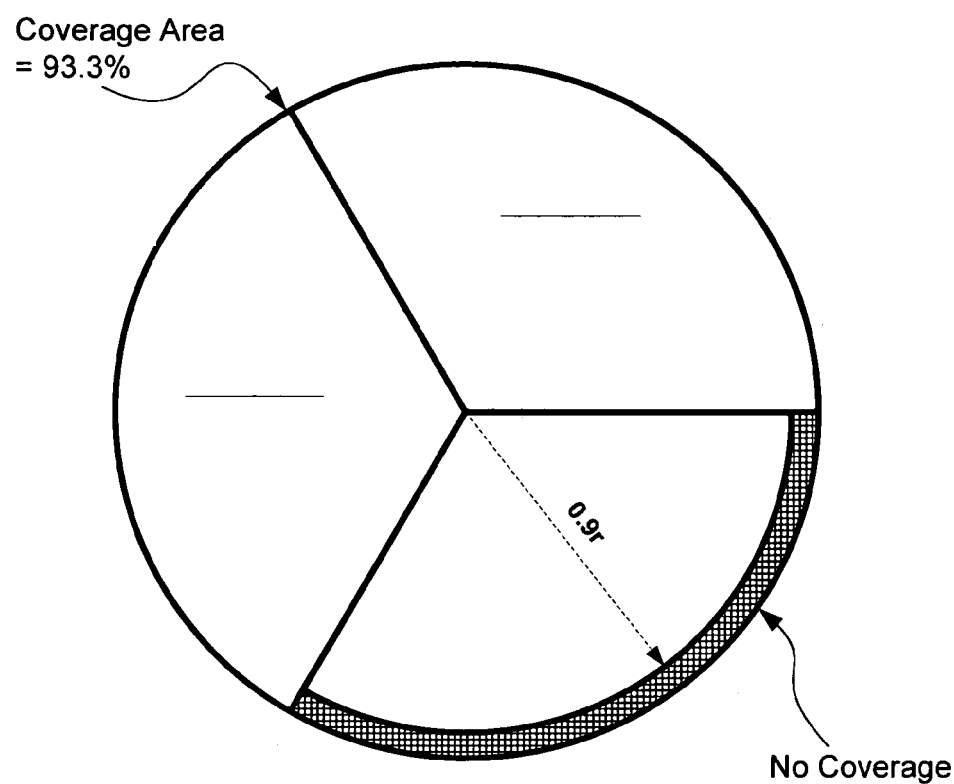
FIG. 6 is a diagram showing the impact of losing an antenna branch after implementation of active remediation, according to certain embodiments of the invention.

Transmitting the combined signal using a single antenna branch does not significantly reduce the geographic area of coverage of the BTS 185—even if the capacity of the antenna branches and associated equipment is equivalent. The BTS 185 may lose approximately 50% of output power for each downed antenna path, but the capacity of the BTS 185 is not affected. For example, reducing output power per carrier by 50% (3 db), depending on propagation conditions, corresponds to reducing the cell radius (r) by 10% (to 0.9r) and area of coverage within cell by 20%. Referring again to FIG. 2, it should be noted that each BTS 185 serves one of three sectors (cells) comprising the cell site. Therefore, although the coverage area of the sector is reduced to 80%, the total coverage area of all cell site sectors combined is only reduced to 93.3%, as illustrated in FIG. 6.

The reduction in coverage is the result of a decrease in maximum output power that can be achieved in the active branch, which now carries twice the traffic as before detection of the fault 236 and remediation. The reduction in coverage lasts for the duration of the outage caused by the fault 236. In high traffic periods, reducing coverage rather than capacity may be preferable to dropping a relatively large number of calls in progress.

Passive Remediation

As an alternative, a fault 236 on an antenna branch can be addressed by dropping the frequency bands that were carried by the downed branch before the fault occurred. Obviously, dropping the capacity handled by one branch effectively reduces the frequency-carrying capacity of the BTS 185, typically by half. However, the coverage of the BTS 185 likely experiences only slight degradation. In certain embodiments, traffic level is the parameter that determines whether active or passive remediation will be implemented. In low traffic periods, reducing capacity rather than coverage may be preferable, because only calls that are in progress at the time of the fault 236 are dropped. The BTS 185 notifies the BSC 180 of the outage, and the BSC 180 suspends antenna hopping and transmit diversity on that cell (or on the affected branch) until the downed branch has been restored. Thus, low traffic conditions increase the odds that the entire volume of subsequent calls can be successfully carried on the frequency carriers assigned to the active branch.

Dynamic Decision-Making

As mentioned above, certain embodiments of the present invention employ logic to determine whether to transmit the combined frequency bands using the active branch and thereby reduce coverage (active remediation) or to drop the frequency carriers that were carried by the downed branch and thereby reduce capacity (passive remediation). These embodiments base the decision on traffic conditions or other parameters pertinent to the BTS 185 or the network 100, including but not limited to, quality of service, cost or revenue considerations, capacity of the unaffected branches, scheduled maintenance, and time of day.

In one embodiment, upon receiving a fault indicator from the fault detector 235, the TDR controller 210 initiates a communication session with the BSC 180. The TDR controller passes fault data to the BSC 180. The fault data may simply indicate that an antenna branch has been disabled, or may include more detailed information, such as identification of the downed branch, specifications (e.g., capacity, assigned frequencies) of the downed branch, description of the failure, etc. The BSC 180 determines whether to reduce coverage or reduce capacity, based upon current traffic conditions or other parameters as specified in the decision logic.

In another embodiment, the processor 212 initiates a session with the BSC 180, but only to retrieve traffic data and other information needed to determine whether to reduce coverage or reduce capacity. In this embodiment, the processor 212 has the capability to analyze traffic on the BTS. It should be noted that the processor 212 may be integral to the BTS CPU 257. The processor 212 processes the traffic data or other information and determines whether to reduce coverage or reduce capacity, based upon current traffic conditions.

Alternatively, in another embodiment, the BTS CPU 257 makes the determination without resorting back to the BSC 180. Rather, the BTS CPU 257 monitors the traffic occupied by the cell served by the BTS 185 at that time. Each BTS 185 typically communicates with the BSC 180 via a data transmission link such as T1 line. The TDR controller 210 preferably receives commands based on traffic data or other information by interfacing with this data transmission link. The BTS CPU 257 determines whether to reduce coverage or reduce capacity, based upon current traffic conditions, and commands the processor 212 accordingly.

In the preceding embodiments, the traffic data is processed the BSC 180, which can be preprogrammed to trigger switching and combining when traffic levels meet or exceed a predefined threshold. Traffic data can consist of any of the various known or yet to be developed wireless traffic metrics, including quality of service (QoS) parameters and other voice and/or data transmission performance indicators.

Furthermore, in the preceding embodiments, the BSC 180 can proactively monitor traffic either continuously or periodically. The TDR controller 210 can reactively initiate communication with the BSC 180 or monitor the T1 link, or can do so continuously or periodically.

As an additional advantage, the processor 212 preferably periodically or continuously monitors the fault conditions to detect clearance of any fault that required remediation. Once the fault is cleared, the processor 212 reverses the remediation measures and returns the antenna configuration or frequency allocation scheme to normal. Reversal of remediation measures may occur automatically upon clearance of the fault and detection thereof, or in response to an external trigger, such as a "reset" command issued by the processor 212 or an external catalyst. Furthermore, throughout the duration of a fault, the processor 212 preferably periodically or continuously monitors the traffic conditions or other parameters relevant to the choice of remediation measures and employs logic that determines whether active remediation should be discontinued in favor of passive remediation, or vice versa.

Scalability

Although the previous embodiments have been described with respect to BTSs 185 having two antenna paths, the present invention is fully scalable and can be used to implement diversity and redundancy in BTSs 185 having any number of antenna paths.

Figure 7:
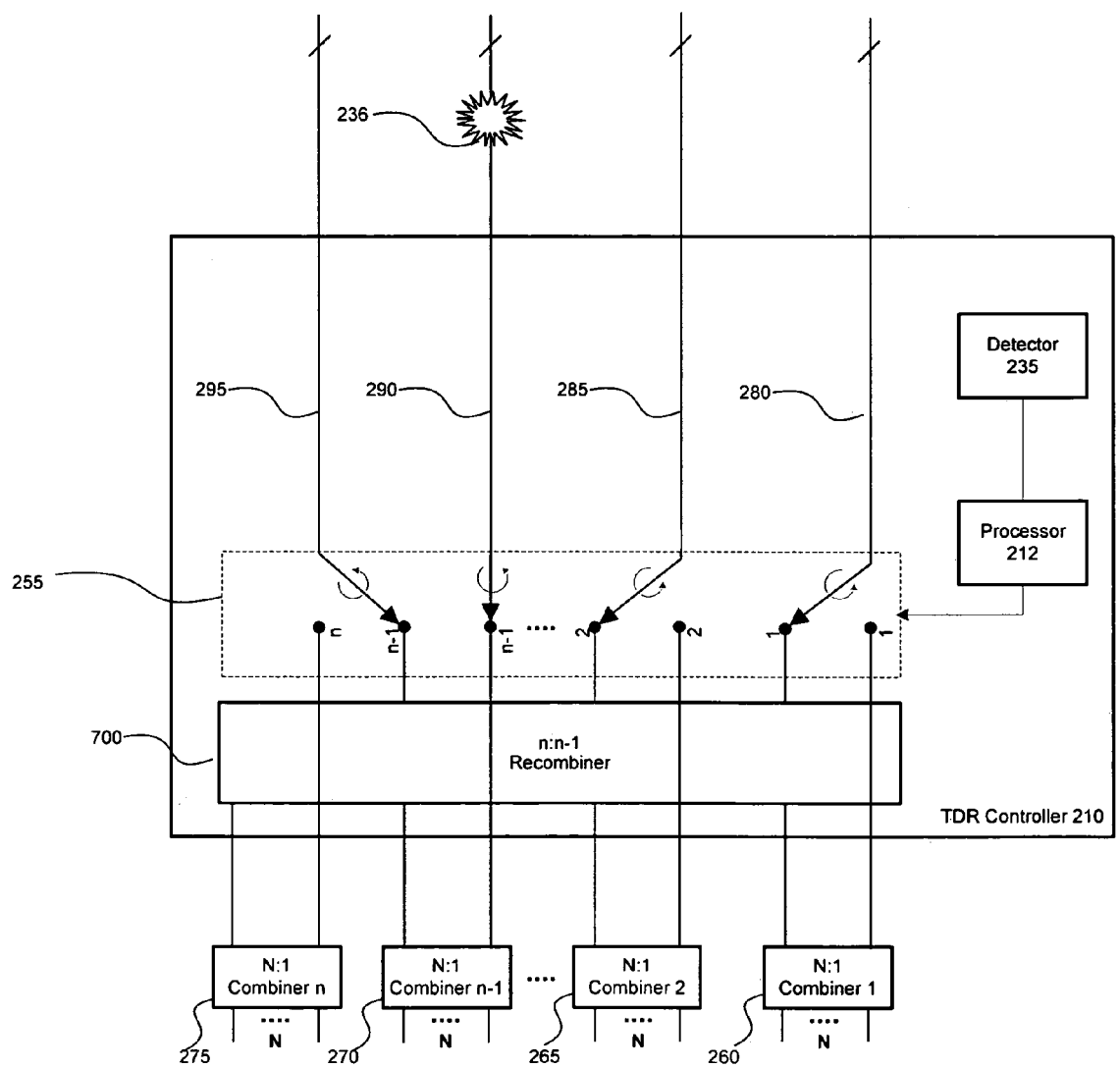
FIG. 7 is a block diagram illustrating the functional configuration of a scalable embodiment of the exemplary TDR controller in remediation mode.

FIG. 7 is a block diagram illustrating the functional configuration of a scalable embodiment of the exemplary TDR controller in remediation mode. The embodiment shown demonstrates that n antenna paths can be controlled using a single TDR controller 210. The TDR controller 210 shown contains n combiners, including combiner(1) 260, combiner(2) 265, combiner(n−1) 270, and combiner(n) 275. In diversity mode, each of these combiners is directly connected to feeder(1) 280, feeder(2) 285, feeder(n−1) 290, and feeder(n) 295, respectively. Each of these combiners is also connected to the input side of a recombiner 700 having a combination ratio of n:n−1. If, however, active remediation is implemented in response to a fault 236 on the antenna path associated with feeder(n−1) 290, feeder(1) 280 is switched from the output of combiner(1) 260 (position 1) to the adjacent output of recombiner 700—shown as position 1'. Feeder(2) 285 is switched from the output of combiner(2) 265 (position 2) to the adjacent output of Combiner 300—shown as position 2'. Feeder(n−1) 290 is not switched (i.e., remains connected to its combiner). Feeder(n) is switched from the output of combiner(n) 270 (position n) to the adjacent output of recombiner 700—shown as position n−1'.

Antenna hopping and/or transmit diversity can continue on the unaffected branches after active remediation is implemented by dropping the affected branches from the diversity scheme.

Passive remediation can be selectively implemented as well as a response to a fault 236 on any of the antenna paths 280, 285, 290, or 295. As with the previously described embodiments, passive remediation requires time slot repacking of the frequencies carried on the downed feeder. BSC 180 performs frequency repacking by reassigning subsequent wireless calls to frequency carriers that were unaffected by the fault, until the BTS 185 indicates that the downed branch has been restored.

Flexibility

Figure 8:
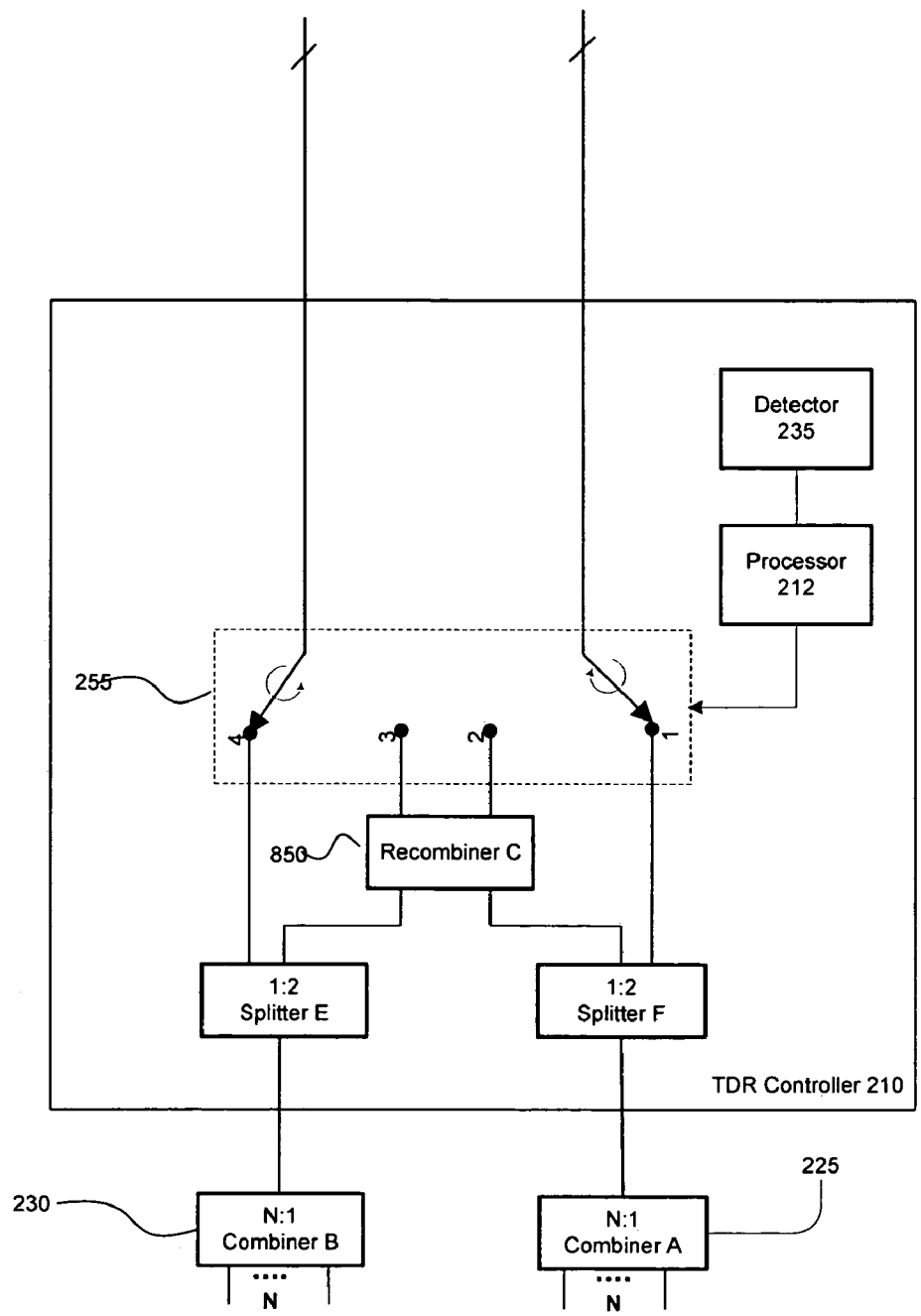
FIG. 8 is a block diagram illustrating the functional configuration of an alternative embodiment of a TDR controller in diversity mode.

The concepts and principles of the present invention are equally implementable with a TDR controller having any configuration and elements as components. For example, FIG. 8 is a block diagram illustrating the functional configuration of an embodiment of a TDR controller that utilizes one-to-two splitters E and F and a 3 dB hybrid combiner as Recombiner C. When split, the output power of each of Combiners A and B is reduced by half. However, MCPA A and MCPA B are preferably high-gain devices that require only low power input signals. The signals emitted from the TRXs are relatively high power; therefore, it is possible to lose power along the antenna path to the respective MCPA without affecting the operation or integrity of the transmitted signal. The implementation shown in FIG. 8 is in diversity mode—i.e., no fault has been detected, so the BTS is operating normally. It should be noted that the output ports of the splitters E and F must be well isolated to prevent back radiation. Those skilled in the art will appreciate the various methods of isolating splitters.

Figure 9:
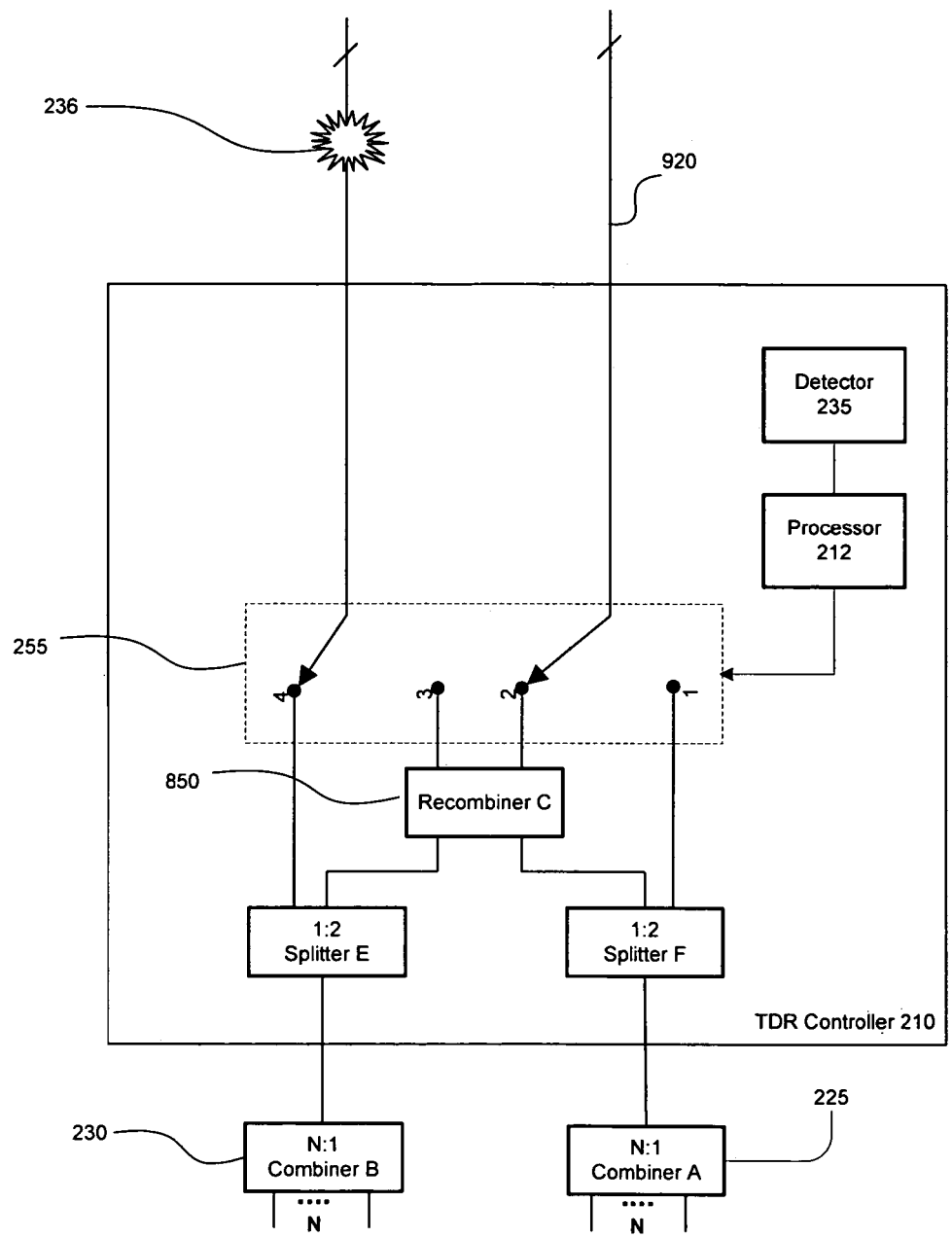
FIG. 9 is a block diagram illustrating the functional configuration of the embodiment of FIG. 8 in remediation mode.

FIG. 9 is a block diagram illustrating the functional configuration of the embodiment of FIG. 8 in remediation mode. Those skilled in the art will recognize that Recombiner C 850 can have one or more outputs. Advantageously, there is no need to recalibrate the combined signal between all carriers after switching to the surviving branch 920.

Figure 10:
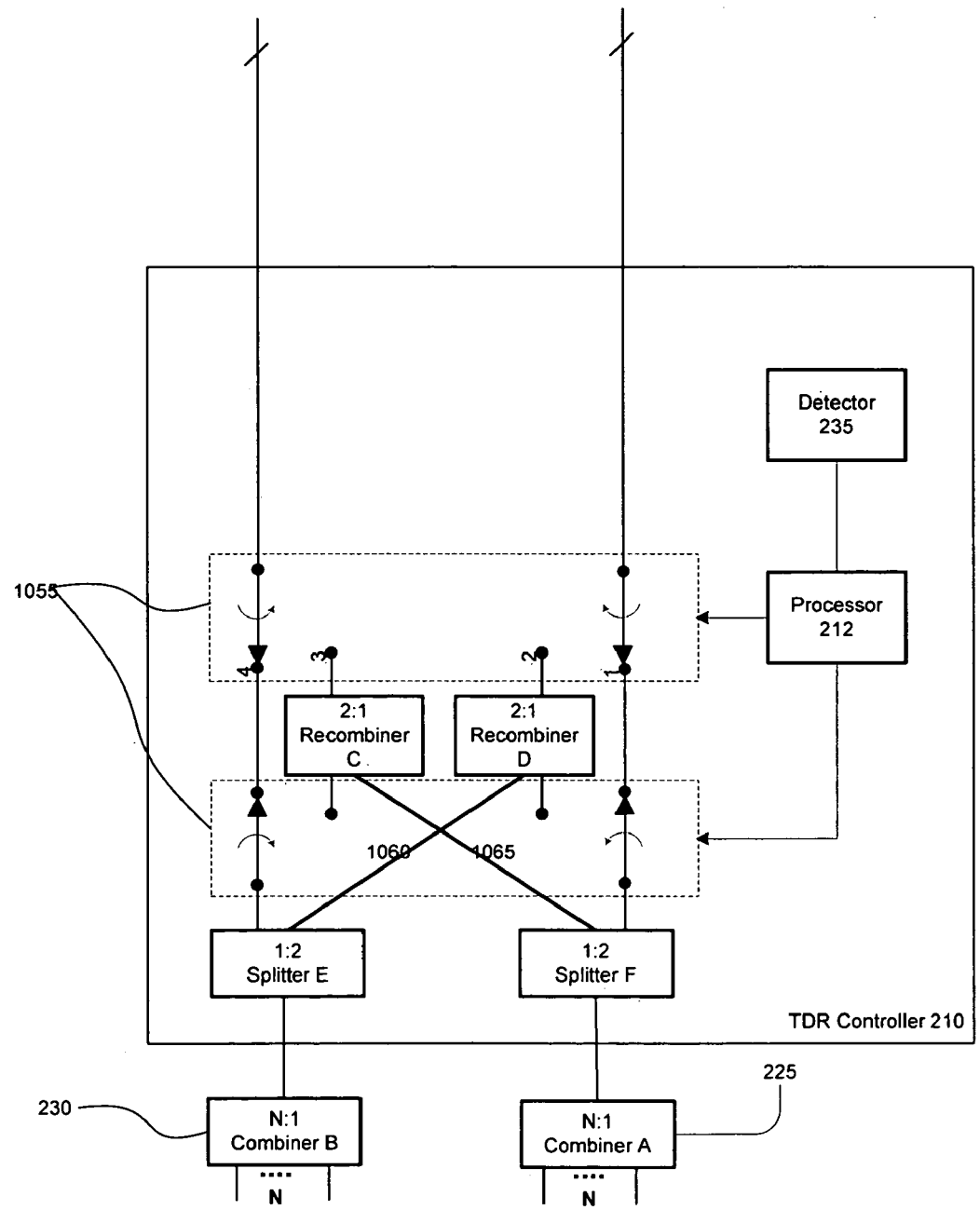
FIG. 10 is a block diagram illustrating the functional configuration of an alternative embodiment of a TDR controller in diversity mode.

For example, FIG. 10 is a block diagram illustrating the diversity-mode functional configuration of an embodiment of a TDR controller that utilizes one-to-two splitters E and F and two Recombiners C and D. The switching mechanism 1055 comprises double-pole single-throw switches. An important consideration when implementing this embodiment is the length of cables 1060 and 1065. The cable lengths must be equal and relatively short in order to balance the signal level and delay.

Figure 11:
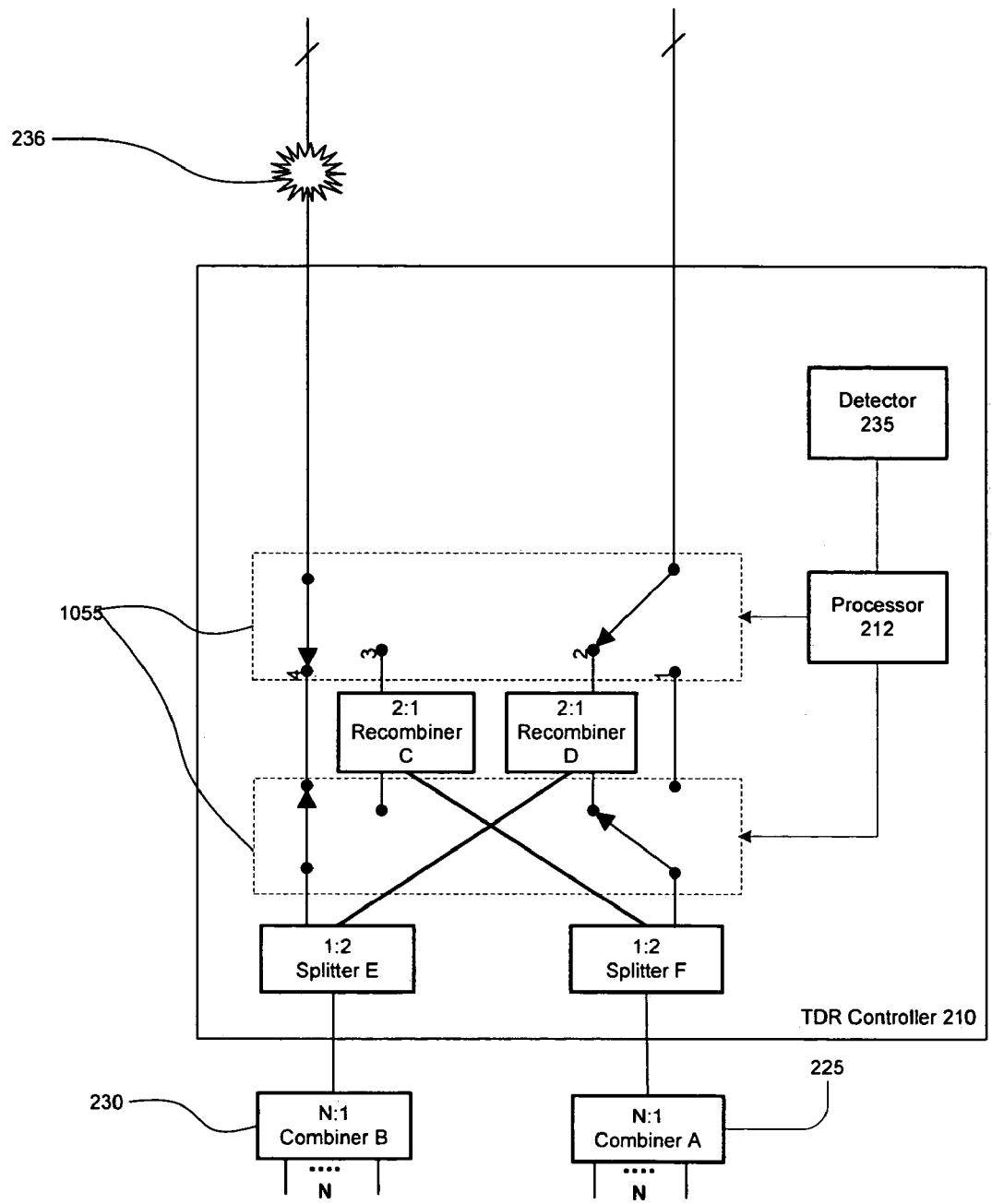
FIG. 11 is a block diagram illustrating the functional configuration of the embodiment of FIG. 10 in remediation mode.

FIG. 11 is a block diagram illustrating the functional configuration of the embodiment of FIG. 10 in remediation mode.

Additions, deletions, substitutions, and/or modifications can be made to the systems and processes disclosed herein and the elements or embodiments thereof without departing from the spirit and scope of various principles, features, aspects, and advantages of the present invention.

For example, although described as a unitary device, the TDR controller 210 of the present invention can be an interconnected system of discrete components that cooperate to perform the functions described herein. The arrangements of the antenna arrays shown in the Figures are illustrative only, as the systems and methods of the present invention are equally applicable to various antenna array configurations, including linear, semicircular, rectangular, wing and zigzag geometries.

The invention claimed is:

1. A Base Transceiver Subsystem (BTS) capable of operating in a diversity mode and a plurality of remediation modes, comprising:
   a plurality of transceivers each having an output, the individual transceiver outputs being configured to provide signals to respective ones of at least two antenna branches, and
     wherein the at least two antenna branches are operational while the BTS operates in the diversity mode;
   a controller including a processor configured to select a mode of operation of the BTS and a fault detector configured to provide a status of faults to the processor; and
   at least one recombiner, the recombiner being operational to reroute signals associated with one of the at least two antenna branches in response to a selection of an active remediation mode of the plurality of remediation modes and the recombiner being disabled in response to a selection of a passive remediation mode of the plurality of remediation modes,
   wherein the processor selects between the diversity mode and the plurality of remediation modes based, at least in part, on the status of faults.

2. The BTS of claim 1, wherein the processor processes the status of faults without input from a base station controller (BSC).

3. The BTS of claim 1, further comprising a switching mechanism operational to switch the operating mode of the BTS upon receiving control signals from the processor.

4. The BTS of claim 1, wherein the processor relays the status of faults to a base station controller (BSC) and the processor switches the BTS to one of the plurality of remediation modes based, at least in part, on commands received from the BSC.

5. The BTS of claim 1, wherein the processor switches the BTS from the one of the plurality of remediation modes to the diversity mode based, at least in part, on the clearance of faults.

6. The BTS of claim 1,
   wherein the status of faults indicates occurrence of at least one fault associated with the at least two antenna branches,
   wherein the processor activates either the active remediation mode or the passive remediation mode based, at least in part, upon a status of any of the following parameters: network traffic, quality of service, BTS traffic, sector traffic, equipment status, cost, and revenue impact.

7. The BTS of claim 1, wherein in the passive remediation mode, the BTS is configured to drop carrier signals associated with a faulty one of the at least two antenna branches.

8. A transmit diversity redundancy ("TDR") controller for use in a Base Transceiver System ("BTS") comprising:
   a processor; and
   a fault detector configured to report a fault associated with at least an individual one of a plurality of antenna branches of the BTS to the processor,
   wherein the processor is configured to selectively activate at least one recombiner based, at least in part, on a reported fault,
   wherein the processor is configured to activate the recombiner in an active remediation mode of the BTS and the processor is configured to effectively disable the recombiner in a passive remediation mode of the BTS.

9. The TDR controller of claim 8,
   wherein the BTS is configured to selectively operate in diversity mode and one of a plurality of remediation modes, the plurality of remediation modes including the active remediation mode and the passive remediation mode, and wherein the processor commands the BTS to operate in the one of the plurality of remediation modes based, at least in part on the reported fault.

10. The TDR controller of claim 8, wherein the processor is configured to select between the active remediation mode and the passive remediation mode based, at least in part, upon the status of any of the following parameters: network traffic, BTS traffic, quality of service, sector traffic, equipment status, cost, and revenue impact.

11. The TDR of claim 8, wherein in the passive remediation mode, the TDR controller configures the BTS to drop carrier signals associated with at least an individual one of a plurality of antenna branches corresponding to the reported fault.

12. A method for switching a Base Transceiver Subsystem (BTS) having at least one recombiner from operating in diversity mode to operating in a remediation mode comprising:

detecting a fault in one of at least two antenna branches of the BTS;

selecting between an active remediation mode and a passive remediation mode, in response to detection of the fault and based, at least in part, on a status of at least one parameter; and selectively activating the at least one recombiner responsive to the selection between the active and passive remediation modes.

13. The method of claim 12, further comprising:

dropping carrier signals associated with an antenna branch corresponding to the fault in response to a selection of the passive remediation mode.

14. The method of claim 12, further comprising:

reducing a number of frequency bands carried by a plurality of antennas of the BTS in response to a selection of the passive remediation mode.

15. The method of claim 12, further comprising:

reducing output power associated with individual ones of a number of frequency bands carried by a plurality of antennas of the BTS in response to a selection of the active remediation mode.

* * * * *